United States Patent [19]

Ackroyd

[11] Patent Number: 5,564,467
[45] Date of Patent: Oct. 15, 1996

[54] POPPET CHECK VALVE

[75] Inventor: Rand H. Ackroyd, Methuen, Mass.

[73] Assignee: Watts Investment Company, Wilmington, Del.

[21] Appl. No.: 301,691

[22] Filed: Sep. 7, 1994

[51] Int. Cl.$^6$ .................................................. F16K 15/06
[52] U.S. Cl. ........................................ 137/529; 137/535
[58] Field of Search ..................................... 137/529, 535

[56] References Cited

U.S. PATENT DOCUMENTS

| | | | |
|---|---|---|---|
| 711,792 | 10/1902 | Smith | 137/535 |
| 813,145 | 2/1906 | Fancher | 137/535 |
| 1,462,081 | 7/1923 | Breeden | 137/535 X |
| 1,786,605 | 12/1930 | Durning | 137/535 X |
| 2,119,851 | 6/1938 | Cave | 137/535 X |
| 2,214,459 | 9/1940 | Gottlieb | 137/535 |
| 2,523,192 | 9/1950 | Brown | 137/535 |
| 2,547,882 | 4/1951 | Norton | 137/535 X |
| 3,376,935 | 4/1968 | Baker | 137/535 X |
| 3,640,306 | 2/1972 | Vogt | 137/529 X |
| 4,072,167 | 2/1978 | Habiger | 137/535 |
| 4,298,023 | 11/1981 | McGinnis | 137/535 X |

FOREIGN PATENT DOCUMENTS

| | | | |
|---|---|---|---|
| 627605 | 10/1927 | France | 137/535 |
| 760844 | 3/1953 | Germany | 137/535 |
| 60349 | 1/1939 | Norway | 137/529 |
| 729934 | 5/1955 | United Kingdom | 137/529 |

*Primary Examiner*—John Rivell
*Attorney, Agent, or Firm*—Fish & Richardson P.C.

[57] ABSTRACT

A poppet check valve for resisting fluid flow through an orifice in a backflow direction includes a valve element, a valve seat defining a valve orifice, and at least first and second torsion springs mounted to apply a pre-determined closing force to bias the valve element toward sealing engagement upon the valve seat. The pre-determined closing force applied by each torsion spring has an axial component, applied in the axial direction, and a lateral component, applied generally transverse to the axial direction. The axial component has a first value with the valve element in a first position and a second value with the valve element in a second position more spaced from the valve seat, the first value being greater than the second value. The lateral component also has a first value in the first position of the valve element and a second value in the second position, the first value being less than the second value. The axial components are applied in alliance and the lateral forces are applied in mutual (cancelling) opposition.

6 Claims, 3 Drawing Sheets

POPPET CHECK VALVE

BACKGROUND OF THE INVENTION

This invention relates to poppet check valves, in particular for resisting backflow.

A typical prior art poppet check valve 10, shown, e.g., in FIGS. 1 and 2, has a valve element 12 positioned for engagement upon an opposed valve seat 14 to resist flow through an orifice 11 defined by the seat until the pressure of the flow exceeds a predetermined value and lifts the valve element from the seat. In the typical prior art poppet valve 10, the valve element 12 is biased toward the valve seat 14 by an axially aligned compression spring 16 disposed about the valve stem 13 and bearing against a pin 15. As a result, as the valve element 12 is displaced from the seat 14, e.g. by fluid flowing through the orifice in the direction of arrow, $F_w$, the spring 16 is compressed (FIG. 2), thus causing the spring 16 to exert a spring load, $F_s$, that increases with displacement distance, D, of the valve 12 from the seat 14, thereby creating a larger pressure drop across the valve opening.

In another type of check valve, e.g. as described in Habiger U.S. Pat. No. 4,072,167, an arm of a centrally fixed torsional spring biases a ball in the valve against a valve seat. As the ball moves away from the valve seat, the arm of the spring rotates with respect to the ball to compress the spring.

In another type of valve, e.g. as described in Smith U.S. Pat. No. 711,792, two bow-springs each exert a vertical force against opposite edges of a valve element to bias the element against a valve seat. The vertical force exerted by the bow-springs increases with the displacement of the valve element away from the valve seat.

SUMMARY OF THE INVENTION

According to the invention, a poppet check valve for resisting fluid flow through an orifice in a backflow direction comprises a valve element, a valve seat defining a valve orifice, a first torsion spring mounted in a position to engage upon the valve element in a manner to apply a pre-determined closing force to bias the valve element toward engagement upon the valve seat to seal the valve orifice, and a second torsion spring mounted in a position to engage upon the valve element in a manner to apply a pre-determined closing force to bias the valve element in an axial direction, toward engagement upon the valve seat to seal the valve orifice. The pre-determined closing force applied by each torsion spring comprises an axial component, applied in the axial direction, and a lateral component, applied generally transverse to the axial direction. The axial component has a first value with the valve element in a first position disposed in sealing engagement upon the valve seat and the axial component has a second value with the valve element in a second position spaced from sealing engagement upon the valve seat, the first value of the axial component being greater than the second value of the axial component. The lateral component also has a first value with the valve element in a first position disposed in sealing engagement upon the valve seat and the lateral component having a second value with the valve element in a second position spaced from sealing engagement upon the valve seat, the first value of the lateral component being less than the second value of the lateral component. The position of the first torsion spring relative to the position of the second torsion spring is selected to cause the lateral component of the pre-determined closing force applied by the first torsion spring to act generally in opposition to the lateral component of the pre-determined closing force applied by the second torsion spring, and the position of the first torsion spring relative to the position of the second torsion spring is further selected to cause the axial component of the pre-determined closing force applied by the first torsion spring to act generally in alliance with the axial component of the pre-determined closing force applied by the second torsion spring.

Preferred embodiments of the invention may include one or more of the following additional features. The valve element comprises a valve cover, a valve stem having an axis aligned with the axial direction, and a valve pin extending transversely from the valve stem, the first torsion spring and the second torsion spring positioned to apply the pre-determined closing force upon the valve pin. The valve element comprises means for adjusting the axial position of the first and second torsion springs, thereby to adjust the values of the axial components of the pre-determined closing force applied by the first and second torsion springs in at least the first position and the second position. The poppet check valve may further comprise a third torsion spring mounted in a position to engage upon the valve element in a manner to apply a pre-determined closing force to bias the valve element toward engagement upon the valve seat to seal the valve orifice, and a fourth torsion spring mounted in a position to engage upon the valve element in a manner to apply a pre-determined closing force to bias the valve element in an axial direction, toward engagement upon the valve seat to seal the valve orifice. The pre-determined closing force applied by each third and fourth torsion spring comprises an axial component, applied in the axial direction, and a lateral component, applied generally transverse to the axial direction, the axial component having a first value with the valve element in a first position disposed in sealing engagement upon the valve seat and the axial component having a second value with the valve element in a second position spaced from sealing engagement upon the valve seat, the first value of the axial component being greater than the second value of the axial component, and the lateral component having a first value with the valve element in a first position disposed in sealing engagement upon the valve seat and the lateral component having a second value with the valve element in a second position spaced from sealing engagement upon the valve seat, the first value of the lateral component being less than the second value of the lateral component. The position of the third torsion spring relative to the position of the fourth torsion spring is again selected to cause the lateral component of the pre-determined closing force applied by the third torsion spring to act generally in opposition to the lateral component of the pre-determined closing force applied by the fourth torsion spring, and the position of the third torsion spring relative to the position of the fourth torsion spring is again further selected to cause the axial component of the pre-determined closing force applied by the third torsion spring to act generally in alliance with the axial component of the pre-determined closing force applied by the fourth torsion spring. The positions of the third and fourth torsion springs relative to the positions of the first and second torsion springs are selected to cause the axial component of the pre-determined closing force applied by the third and fourth torsion springs to act generally in alliance with the axial component of the pre-determined closing force applied by the first and second torsion springs. Preferably, the poppet check valve further comprises a valve cover, a valve stem having an axis aligned with the axial direction, and a first valve pin extending transversely from the valve stem, the first torsion spring and the second torsion spring positioned to apply the pre-determined closing force upon the first valve pin, and a further valve pin extending transversely from the valve stem, the third torsion spring and the fourth torsion spring positioned to apply the pre-determined closing force upon the further valve pin. Also, the valve element comprises means for adjustment of the axial position of the third and fourth torsion springs, thereby to adjust the values of the axial components of the pre-determined closing force applied by the third and fourth torsion springs in at least the first position and the second position.

Objectives of the invention include providing a poppet check valve having a biasing force applied by torsion springs that exert a decreasing spring load, or closing force against, the valve element as the displacement of the valve element from the valve seat increases. A relatively smaller flow force (compared to the flow force required to initially open the valve) is needed to maintain the valve element spaced from the valve seat. As a result, the valve will open in response to a fluid flow pressure above a predetermined threshold, and will remain open at somewhat lesser fluid flow pressure, thus reducing the pressure loss across the valve.

These and other features and advantages of the invention will be apparent from the following description of presently preferred embodiments, and from the claims.

DESCRIPTION OF A PRESENTLY PREFERRED EMBODIMENT

Figure 1:
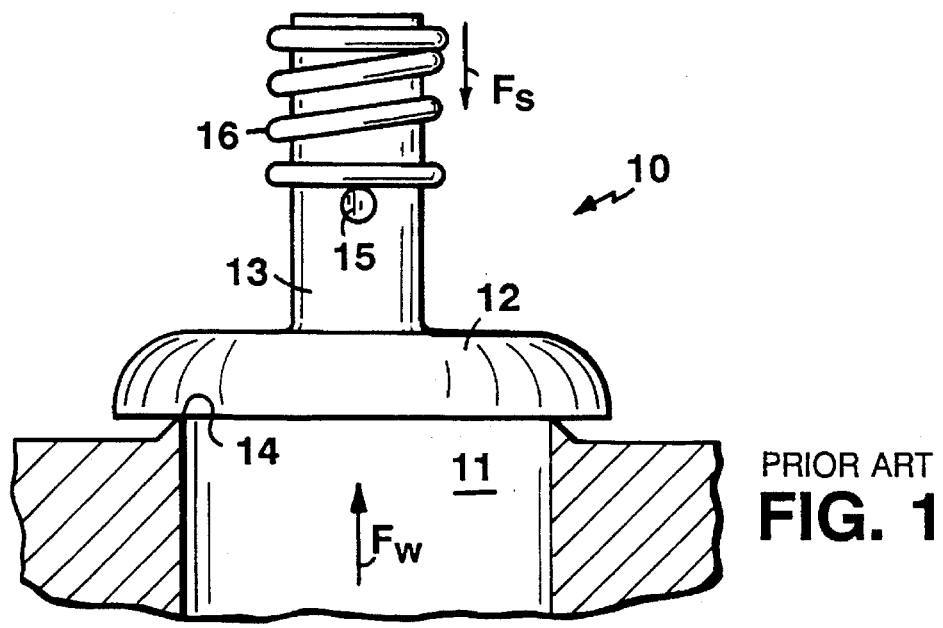
FIG. 1 is a schematic side view of a prior art poppet check valve with the valve element engaged upon the valve seat.
Figure 2:
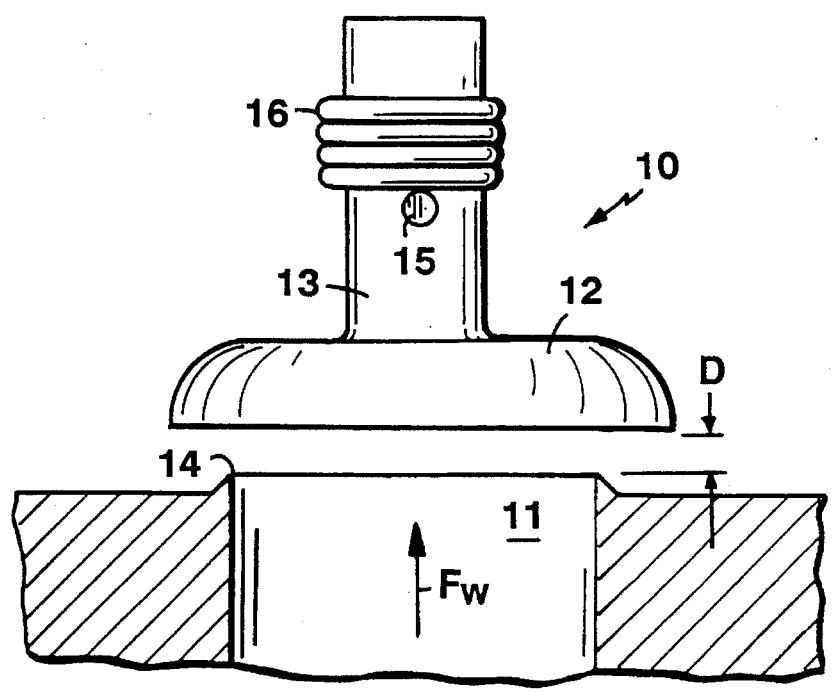
FIG. 2 is a schematic side view of the prior art poppet check valve of FIG. 1 with the valve element displaced from engagement upon the valve seat.
Figure 3:
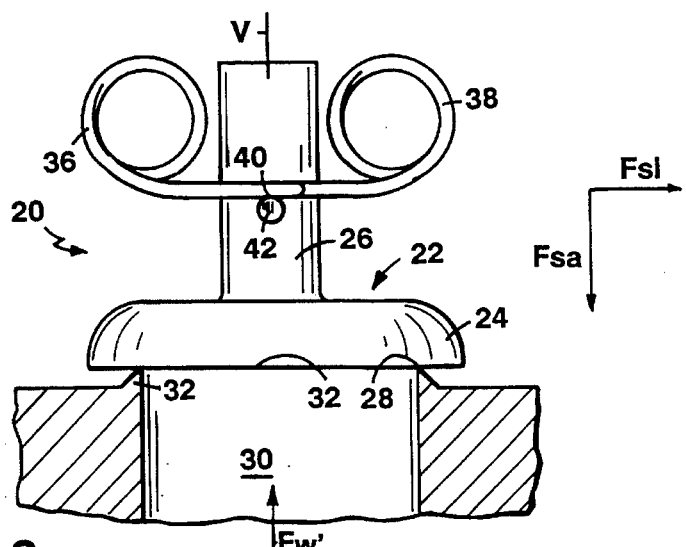
FIG. 3 is a schematic side view of a poppet check valve with torsion springs of the invention.
Figure 4:
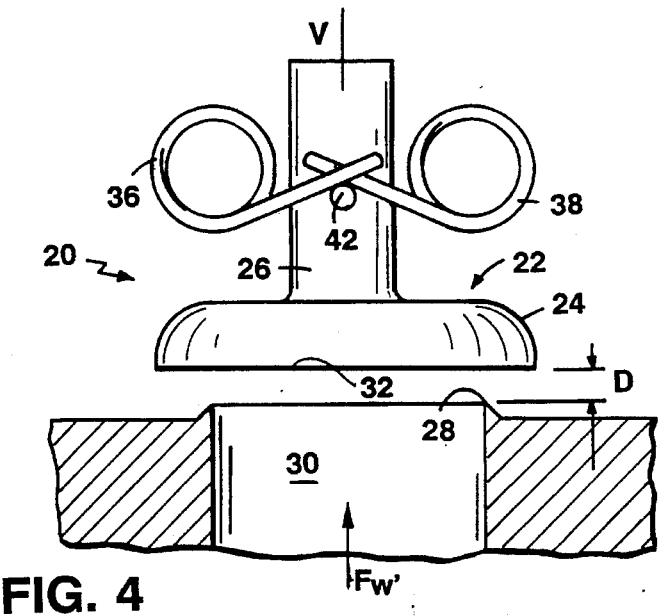
FIG. 4 is a schematic side view of the poppet check valve of FIG. 3, with the valve element displaced from the valve seat.

Referring to FIGS. 3 and 4, a poppet check valve 20 of the invention includes a valve element 22 consisting of a valve cover 24 and a valve stem 26. The valve cover 24 is generally cylindrical in shape and sized to engage upon a valve seat 28 surrounding and defining a valve orifice 30. In the embodiment shown, the valve seat 28 is defined by an upstanding lip 32.

According to the invention, the valve 20 further includes a pair of torsion springs 36, 38 each mounted to bear simultaneously upon the valve element by engagement upon the surface 40 of a pin 42 extending from the valve stem 26.

The torsion springs acting to apply a spring force, $F_s$, to bias the valve cover 24 into sealing engagement upon the valve seat 28.

Figure 3A:
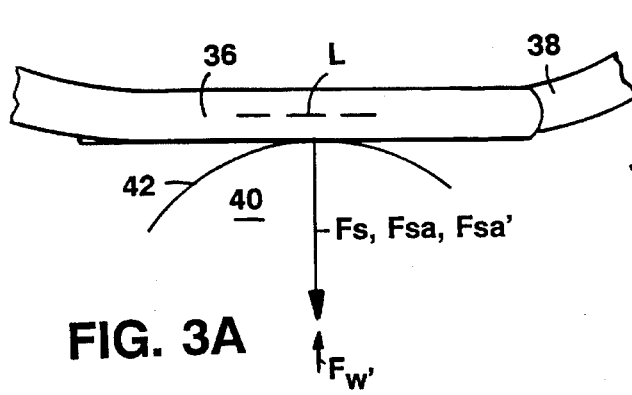
FIG. 3A is an enlarged view of the region of the spring arms bearing upon the pin surface in the poppet check valve of FIG. 3.
Figure 4A:
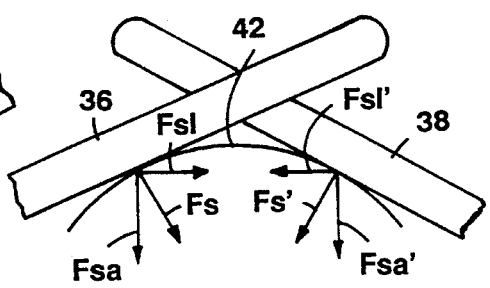
FIG. 4A is an enlarged view of the region of the spring arms bearing upon the pin surface in the poppet check valve of FIG. 4.

Referring to FIG. 3A, each torsion spring 36, 38 mounted to bias the valve element 22 toward engagement upon the valve seat 28 applies a spring force, $F_s$, perpendicular to the axis, L, of the spring arm in the region of engagement of the arm upon the surface 40 of the pin 42.

The spring force, $F_s$, has an axial force component, $F_{sa}$, directed along axis, V, of the valve stem 26 and a lateral force component, $F_{sl}$, directed perpendicular to the axial force component and the axis, V. The total spring force, $F_s$, equals the sum of the axial force component, $F_{sa}$, and the lateral force component, $F_{sl}$.

In the preferred embodiment, the lateral force component, $F_{sl}$, of the first torsion spring 36 is equal and opposed to the lateral force component, $F_{sl'}$, of the second torsion spring 38, with the result that the effective lateral force applied to urge the valve element into displacement is zero.

Referring now to FIGS. 3 and 3A, in the embodiment shown, when the valve cover 24 is sealingly engaged upon the valve seat 28, the axial component, $F_{sa}$, of the spring force applied by each torsion spring 36, 38 is at its maximum, coincidental with and equal to the total force, $F_s$, applied by the torsion springs, with the lateral force component, $F_{sl}$, of the spring force of each torsion spring equal to zero. When the fluid force, indicated by the arrow, $F_w$, opposing the spring biasing force, $F_s$, exceeds the predetermined level of the spring force, $F_s$, the valve cover 24 is lifted from the valve seat 28, allowing fluid to flow through the valve orifice 30 (FIG. 4).

Movement of the valve element 22 from the valve seat 28 changes the angular relationship of the axes, L, of the spring arms 36, 38 with the axis, V, of the valve stem 26 in the region of engagement upon the surface 40 of the pin 42, decreasing the axial force components, $F_{sa}$, $F_{sa'}$, of the spring forces, $F_s$, $F_{s'}$, and increasing the opposed lateral force components, $F_{sl}$, $F_{sl'}$, which merely act against each other. The decrease in axial spring force components, $F_{sa}$, $F_{sa'}$, which acts to urge the valve cover 24 to a closed position, results in a reduction in the loss of pressure through the valve orifice 30.

If the pressure of fluid flow through the orifice 30 decreases, e.g. due to back pressure, the valve element 22 is biased by the axial force components, $F_{sa}$, $F_{sa'}$, of the torsion springs, toward engagement of the valve cover 24 upon the valve seat 28, with the axial force components, $F_{sa}$, $F_{sa'}$, increasing as the distance, D, of the valve cover 24 from the valve seat 28 decreases. If a condition approaching backflow occurs, the valve cover 24 engages upon the valve seat 28 to stop flow through the orifice 30.

The maximum level of the total spring force, $F_s$, applied by the torsion springs 36, 38 to bias the valve cover 24 toward sealing engagement upon the valve seat 28 can be adjusted downwardly from the maximum shown in FIG. 3. This adjustment is achieved by moving the position of the torsion springs 36, 38, downward, relative to the position of central pin 42 on valve stem 26, toward the orifice 30, to a position in which the opposed lateral force components, $F_{sl}$, $F_{sl'}$, of the torsion springs 36, 38 are greater than zero, resulting in lower initial axial force components, $F_{sa}$, $F_{sa'}$, applied to bias the valve cover 24 against the seat 28.

The poppet check valve 20 of the invention can thus be used as a backflow preventer that opens in response to a predetermined pressure, $F_w$, of fluid flow out of the orifice 30 and closes in response to a weaker fluid flow in an opposite direction, with the effective spring biasing force, $F_s$, exerted by the torsion springs 36, 38 on the valve element 22 decreasing as the valve element is moved away from the valve seat 28, thus to reduce pressure drop across the valve.

Figure 5:
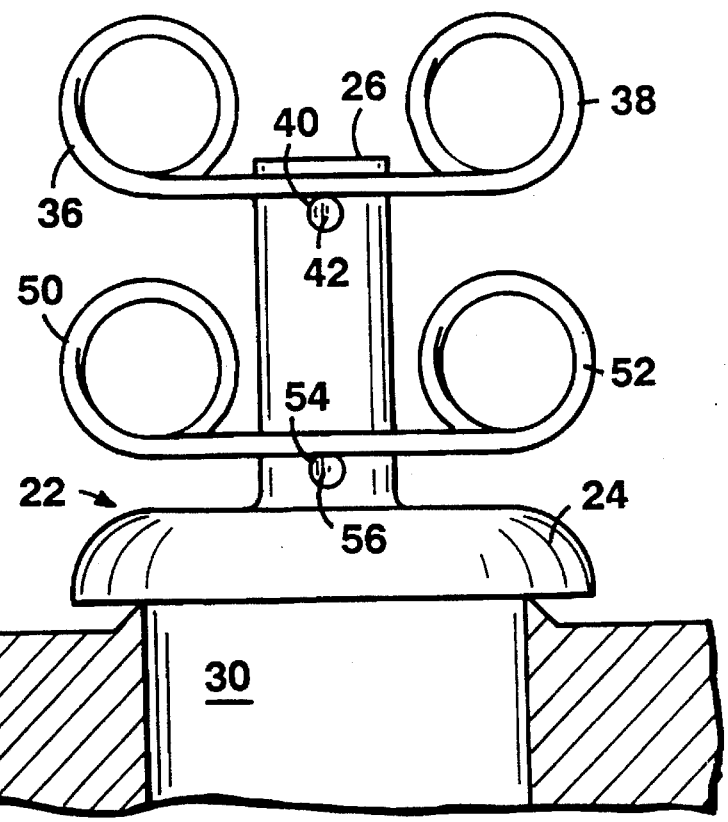
FIG. 5 is a schematic side view of another embodiment of a poppet check valve with pairs of torsion springs of the invention.

Other embodiments are within the following claims. For example, referring to FIG. 5, a second pair of opposed torsion springs 50, 52 may be mounted (e.g. below the first pair of torsion springs 36, 38) to engage upon the surface 54 of a second pin 56 in the manner described above to provide a more uniform vertical loading of the valve element.

Figure 6:
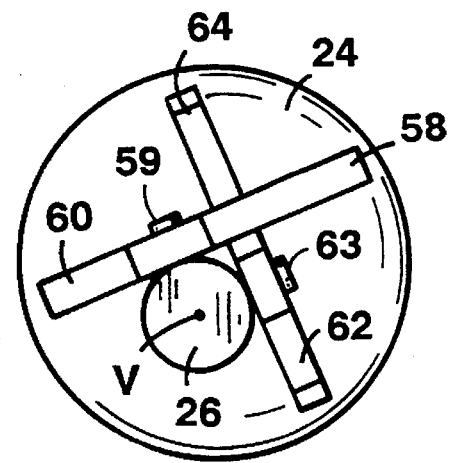
FIG. 6 is a schematic top view of still another embodiment of a poppet check valve with pairs of torsion springs of the invention.

Also, referring to FIG. 6, the radial position of a first pin 59 engaged by a first pair of laterally-opposed torsion springs 58, 60 of the valve stem 26 may differ from the radial position of a second pin 63 engaged by a second pair of laterally-opposed torsion springs 62, 64.

What is claimed is:

1. A poppet check valve for resisting fluid flow through an orifice in a backflow direction, said valve comprising:

a valve element having a central axis, a valve seat defining a valve orifice, a first torsion spring mounted in a position to engage upon said valve element in a manner to apply a pre-determined closing force to bias said valve element toward engagement upon said valve seat to seal said valve orifice, and a second torsion spring mounted in a position to engage upon said valve element in a manner to apply a pre-determined closing force to bias said valve element toward engagement upon said valve seat to seal said valve orifice, said pre-determined closing force applied by each torsion spring comprising an axial component, applied to said valve element in an axial direction at a point generally along said central axis, and a lateral component, applied generally transverse to the axial direction, the axial component having a first value with said valve element in a first position disposed in sealing engagement upon said valve seat and the axial component having a second value with said valve element in a second position spaced from sealing engagement upon said valve seat, the first value of said axial component being greater than the second value of said axial component, and the lateral component having a first value with said valve element in said first position disposed in sealing engagement upon said valve seat and the lateral component having a second value with said valve element in said second position spaced from sealing engagement upon said valve seat, the first value of said lateral component being less than the second value of said lateral component, the position of said first torsion spring relative to the position of said second torsion spring selected to cause the lateral component of the pre-determined closing force applied by said first torsion spring to act generally in opposition to the lateral component of the pre-determined closing force applied by said second torsion spring, and the position of said first torsion spring relative to the position of said second torsion spring further selected to cause the axial component of the pre-determined closing force applied by said first torsion spring to act generally in alliance with the axial component of the pre-determined closing force applied by said second torsion spring.

2. The poppet check valve of claim 1 wherein said valve element comprises a valve cover, a valve stem having an axis aligned with the axial direction, and a valve pin mounted along said central axis and extending transversely from said valve stem, said first torsion spring and said second torsion spring positioned to apply said pre-determined closing force upon said valve pin.

3. The poppet check valve of claim 2 wherein said mounting position of each said torsion spring relative to said pin is adjustable, thereby to adjust the values of the axial components of the pre-determined closing force applied by said first and second torsion springs in at least said first position and said second position.

4. The poppet check valve of claim 1, further comprising a third torsion spring mounted in a position to engage upon said valve element in a manner to apply a pre-determined closing force to bias said valve element toward engagement upon said valve seat to seal said valve orifice, and a fourth torsion spring mounted in a position to engage upon said valve element in a manner to apply a pre-determined closing force to bias said valve element toward engagement upon said valve seat to seal said valve orifice, said pre-determined closing force applied by each third and fourth torsion spring comprising an axial component, applied to said valve element in an axial direction at a point generally along said central axis, and a lateral component, applied generally transverse to the axial direction, the axial component having a first value with said valve element in said first position disposed in sealing engagement upon said valve seat and the axial component having a second value with said valve element in said second position spaced from sealing engagement upon said valve seat, the first value of said axial component being greater than the second value of said axial component, and the lateral component having a first value with said valve element in said first position disposed in sealing engagement upon said valve seat and the lateral component having a second value with said valve element in said second position spaced from sealing engagement upon said valve seat, the first value of said lateral component being less than the second value of said lateral component, the position of said third torsion spring relative to the position of said fourth torsion spring selected to cause the lateral component of the pre-determined closing force applied by said third torsion spring to act generally in opposition to the lateral component of the pre-determined closing force applied by said fourth torsion spring, and the position of said third torsion spring relative to the position of said fourth torsion spring further selected to cause the axial component of the pre-determined closing force applied by said third torsion spring to act generally in alliance with the axial component of the pre-determined closing force applied by said fourth torsion spring, and the positions of said third and fourth torsion springs relative to the positions of said first and second torsion springs selected to cause the axial component of the pre-determined closing force applied by said third and fourth torsion springs to act generally in alliance with the axial component of the pre-determined closing force applied by said first and second torsion springs.

5. The poppet check valve of claim 4 further comprising a valve cover, a valve stem having an axis aligned with the axial direction, and a first valve pin mounted along said central axis and extending transversely from said valve stem, said first torsion spring and said second torsion spring positioned to apply said pre-determined closing force upon said first valve pin, and a further valve pin mounted along said central axis and extending transversely from said valve stem, said third torsion spring and said fourth torsion spring positioned to apply said pre-determined closing force upon said further valve pin.

6. The poppet check valve of claim 5 wherein said mounting position of each said torsion spring relative to said pins is adjustable, thereby to adjust the values of the axial components of the pre-determined closing force applied by said first and second torsion springs in at least said first position and said second position.

* * * * *